W. P. & S. G. THOMSON.
RAIL JOINT.
APPLICATION FILED DEC. 27, 1907.
937,117.
Patented Oct. 19, 1909.
2 SHEETS—SHEET 1.
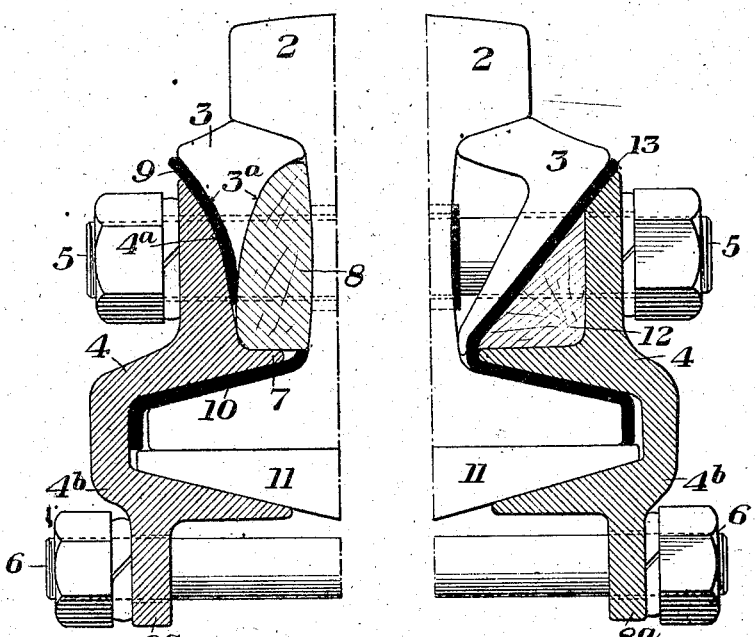
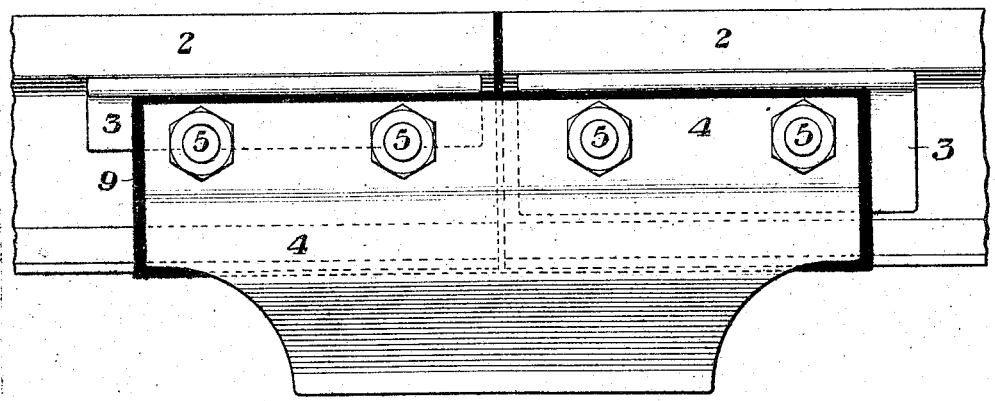
WITNESSES
R. A. Balderson
W. W. Swartz
INVENTORS
W. P. Thomson
S. G. Thomson,
by Bakewell, Byrnes & Parmelee,
their Atty's W. P. & S. G. THOMSON.
RAIL JOINT.
APPLICATION FILED DEC. 27, 1907.
937,117.
Patented Oct. 19, 1909.
2 SHEETS—SHEET 2.
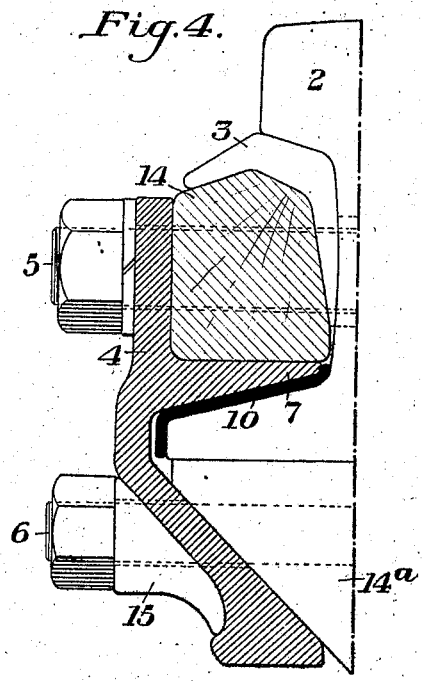
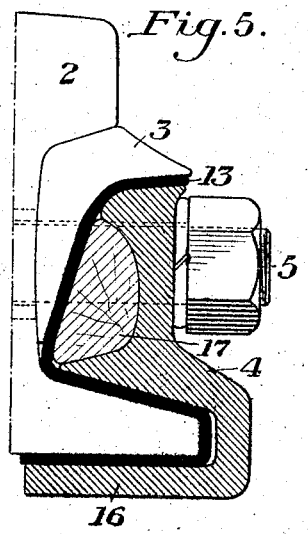
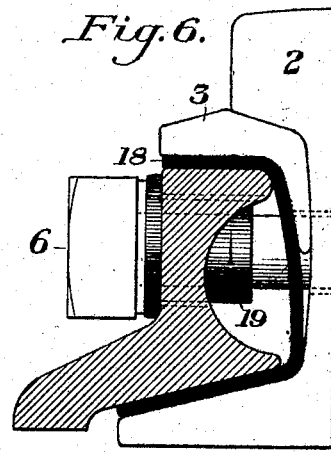
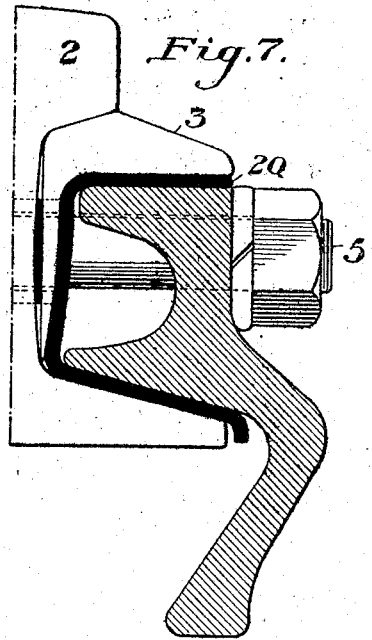
WITNESSES
R. A. Balderson
W. W. Swartz
INVENTORS
W. P. Thomson
S. G. Thomson
by Bakewell, Byrnes & Parmelee,
their Attys.

UNITED STATES PATENT OFFICE.

WILLIAM P. THOMSON AND SAMUEL G. THOMSON, OF PHILADELPHIA, PENNSYLVANIA, ASSIGNORS TO THOMSON-THOMSON COMPANY, OF PHILADELPHIA, PENNSYLVANIA, A PARTNERSHIP.

RAIL-JOINT.

937,117. Specification of Letters Patent. Patented Oct. 19, 1909.

Application filed December 27, 1907. Serial No. 408,294.

*To all whom it may concern:*

Be it known that we, WILLIAM P. THOMSON and SAMUEL G. THOMSON, of Philadelphia, in the county of Philadelphia and State of Pennsylvania, have invented a new and useful Improvement in Rail-Joints, of which the following is a full, clear, and exact description, reference being had to the accompanying drawings, forming part of this specification, in which:

Figures 1 and 2 are sectional views illustrating different forms of our improved joint; Fig. 3 is a side elevation; and Figs. 4, 5, 6, and 7 are sectional views showing other forms of the joint, and hereinafter more fully described.

Our invention has relation to the class of rail joints, and is designed to afford a stiff insulated joint, with the broadest possible bearing surfaces, whereby the crushing of the insulation will be prevented. We accomplish this object by the employment of separate inside plates, which are arranged to make direct contact under the head of each one of the rails, and which afford wide bearing surfaces for the insulation interposed between them and the outer splicing bar. These inside plates are preferably designed so as to afford the widest possible bearing area for insulation on the base of the rail, being arranged to permit the insulation to come in against the web of the rail adjacent to its foot. This design permits the use of a minimum amount of metal in the inner bars, which will only extend down sufficiently far to permit their web members to engage the bolts, whereby they are held from slipping out endwise, as well as leaving a space at the base of the rail, which is necessary to provide for an insulated bearing surface. These inside plates afford a wide bearing under the head and permit the maximum bearing on the foot of the rail for an insulated outside bar, which gives the required vertical and lateral stiffness to the joints. These same features may, however, be used in a positive joint where insulation is not employed.

The precise nature of our invention will be best understood by reference to the accompanying drawings, in which we have shown a number of modifications thereof, which will now be described, it being premised, however, that our invention is susceptible of various other modifications.

In the drawings, the numeral 2 wherever seen designates one of the rails, the numeral 3 the inner bar, and the numeral 4 the outer bar.

5 designates the joint bolts which extend through the rail, and 6 designates the bolts which connect the outer bars below the base of the rails, in the forms of our invention in which this feature is employed.

In the form shown in Fig. 1, the inside bar 3 is a wedge-shaped bar, which, instead of providing a single insulating bearing face opposite the rail bearing, has two broad slanting or curved faces 3ª to contact with the insulation. The other bar 4 is shown as having a corresponding inner bearing face 4ª for the insulation, with a lip or flange 7, which extends inwardly under the insulating block 8. The outer bar is also shown as having a portion 4ᵇ extending around and underneath the base of the rail and supporting a block 11, also having a depending bolting flange 8ª. 9 designates insulation interposed between the outer bearing surface 3ª of the inside bar 3 and the inner bearing surface 4ª of the outer bar 4. 10 is insulation which is interposed between the outer bar 4 and the base flange of the rail. Supporting blocks are placed between the under side of the base flange of the rail and the inwardly extending portions 4ᵇ of the outer bars. Instead of insulating wooden blocks, metal blocks or bars may be used with insulation between them and the outside bars. The downwardly extending member of the inner bar is at a considerable distance from the web of the rail, thus permitting the use of the block 8 as inside insulation as well as to form a wedging support.

In the form shown in Fig. 2, the inside bar has a very broad downwardly and inwardly slanting supporting face on the outer side of its tapering lower member. In this form, a wooden block 12 is fitted into the inner angle of the outer bar, and the insulating piece 13 is interposed between the slanting bearing face of the inner bar and the inner face of the block 12 and is extended to prevent any metallic contact between the inner and outer bars. It is also extended to prevent metallic contact between the upper surface of the base flange of the rail and the corresponding portion of the outer bar. This is a very desirable design, as it permits the use of the full width of the base of the rail for the insulation. The block 12 is preferably used as a filler, but the outside bar might be formed to fill this space. The outer bar on the block acts as a wedge to keep the parts tight, and as the bearing faces are very wide and flexible, the insulation is much harder to destroy by the pinching action, which is so often found in joints where the insulation is placed between the narrow rigid faces at right angles to the acting forces.

The form in Fig. 4 shows the use of a wood block 14, in combination with the inside bearing bar and the outside girder bar which supports a block 14ª under the base of the rail. The inside bar has its tapering depending flange fitting against the web of the rail and the under face of its upper member is curved or formed at an angle over the top of the block 14, for the purpose of increasing the bearing face. 15 is a washer which provides a vertical bolting face for the depending flanged member of the outer bar.

In the form shown in Fig. 5, the under or outer face of the inner bar is inclined downwardly and inwardly at a greater angle than is shown in Fig. 4, so that the downwardly extending member may act to a still greater extent in carrying the load. This inner bar also permits the insulation to contact with the web of the rail adjacent to its base. The outer bar and the insulation are shown as extending horizontally under the rail base, as at 16, to form a chair, and long bolts are not employed below the rail base. The wooden block 17 in this form acts as a wedge or filler.

In the form shown in Fig. 6, the inner bar is in the form of an extension plate, whose tapering depending member fits the web of the rail and terminates at its lower end at about the center of the bolt holes. The insulation 18 is shown as fitting the broad under face of this plate, and also fitting the entire width of one side of the rail base. 19 indicates an insulating sleeve around the bolt.

Fig. 7 shows an inside extension bar with a wider face, and a longer tapering web member which extends almost to the base of the rail. The insulation 20 is here shown as bearing along the entire width of one side of the rail base. The outside splicing bar also has a depending flange member to afford additional stiffness to the joint.

In all these forms, it will be noted that the inside bar bears upwardly against the under side of the head of the rail and has an extension outwardly beyond such head for the purpose of increasing the bearing for the insulation. In an insulated joint it is, of course, necessary that the inside bar be made in separate sections, so that it will not extend continuously across the joint between the rails. This is shown in Fig. 3. In a non-insulated joint, however, the inside bars or plates may be in one continuous piece. In the insulated type of joint, metallic liners may be employed between the inside and outside plates at one end of the joint in place of the insulation, the insulation being used between the outside bar and the other rail.

The special feature of advantage in the use of the inside bars or plates of the character described results from the inwardly slanting feature of the downwardly extending tapered members. This permits a full bearing for insulation on the top of the rail base and makes the inside bar act as a supporting member to aid very materially in resisting the vertical forces; and on account of its angle to the direction of pull of the bolts, there is much less liability of the insulation being damaged by undue tightening. The slanting faces of these inside bars also lend great flexibility to the point, as well as giving the broadest possible supporting surfaces that can be attained, and afford an arrangement of the parts which very greatly reduces the destruction of the insulation.

While we have shown our invention as applied to ordinary T-rails, it will be obvious that it may be applied to rails of any desired section.

We claim:

1. In a rail joint, a bar or plate standing free from the rail base and contacting with one rail only, said bar having a rib or flange at its top with an under bearing face wider than the under face of the rail head and also having a member extending downwardly from said rib or flange and gradually diminishing in thickness toward its lower end to form on its under face an increased bearing surface for coacting parts of the joint, substantially as described.

2. A rail joint having an inner bar or plate making direct metallic contact with at least one of the rails under the head, said bar having an upper member and another member extending downwardly and tapering to an edge at its lower end, and an outer bar having a portion extending underneath said members, substantially as described.

3. A rail joint having an inner bar or plate making direct metallic contact with only one rail under the head, said bar having an upper member with an under bearing face wider than the under face of the rail head, and a downwardly extending member with a face inclined inwardly sufficiently to permit insulating material to contact with the lower portion of the rail web, and an outer bar extending under and supporting insulation means under said members, substantially as described.

4. In a rail joint, a splice bar or plate standing free from the rail base and having a member contacting on one face with at least one of the rails at the under side of its head and having an opposite insulation bearing surface of greater width than its face bearing under the rail head, said bar having a downwardly extending member with a face slanting inwardly to its lower end, substantially as described.

5. In a rail joint, an inner bar and an outer bar and insulating means between said bars, said inner bar standing free from the rail base and having a downwardly extending member gradually diminishing in thickness for its entire length, and an upper portion contacting with one rail only and also with the insulation and having a greater contacting area on the insulation than on the rail, substantially as described.

6. In a rail joint, inner and outer metallic bars or plates, said inner bar standing free of the foot of the rail and said outer bar having a member extending below the rail base, substantially as described.

7. In a rail joint, inner and outer bars or plates, insulated from each other, said inner bar bearing under the head of the rail and having a downwardly extending member tapering to an edge at its lower end to form increased bearing surface for insulation and said outer bar having a member extending below the rail, substantially as described.

8. In a rail joint, inner and outer bars or plates, said inner bars standing free from the rail foot and having a metallic bearing against at least one of the rails and a downwardly extending member with an inwardly inclined face to form increased bearing surfaces for coacting parts, and said outer bar having a depending flange below the rail base, substantially as described.

9. In a rail joint, a bar or plate contacting under the head of the rail and forming an increased insulating surface, said surface slanting downwardly and inwardly to its lower end insulating means to permit contact with the lower portion of the web of the rail, substantially as described.

10. In a rail joint having an inner and an outer bar extending above the rail base on the same side of the rails, and a block having a lateral side at an angle to the vertical, said block being interposed between said bars and above a portion of said outer bar extending inwardly above the rail base, said inside bar having wider bearing surface on its under side than on its top, substantially as described.

11. In a rail joint, a bar or plate terminating at its lower end above and standing entirely free of the upper face of the rail base, and insulating material, said bar or plate having an upper member contacting with one rail only, and a lower member having an outer bearing face, said insulation contacting with said outer bearing face and with the rail web between the lowest extremity of said bar and the rail base; substantially as described.

12. In a rail joint, a bar or plate having an upper member and a lower member, the latter having bolt-holes therethrough, said upper member having an inner face to contact under the rail head, and said lower member having a substantially flat under insulation bearing face to extend in a downward and inward direction from the upper and outer edge of the bar to the lowest extremity of the bar, said extremity being above and free of contact with the rail base; substantially as described.

13. In a rail joint, a bar or plate to contact under the head of the rail and to terminate at its lower end above and at a substantial distance from the rail foot, said bar or plate having an under face slanting downwardly and inwardly from a point adjacent to its top to the lowest part of the bar; substantially as described.

14. In a rail joint, a bar or plate to contact under the head of the rail and having a downwardly extending member tapering to an edge at its lower end, said edge lying inside of a vertical plane at the outer edge of the rail head, substantially as described.

15. In a rail joint having an inner and an outer bar above the rail base and a block having a lateral side at an angle to the vertical interposed below said inner bar and above said outer bar, substantially as described.

In testimony whereof, we have hereunto set our hands.

WILLIAM P. THOMSON.
SAMUEL G. THOMSON.

Witnesses:
S. E. PATTERSON,
McLEOD THOMSON.